CARBON PILE ELECTRIC REGULATOR

Original Filed Oct. 13, 1939 4 Sheets-Sheet 1

INVENTOR.
FREDERICK NEWTON

BY Young, Emery & Thompson
ATTORNEYS

CARBON PILE ELECTRIC REGULATOR

Original Filed Oct. 13, 1939 4 Sheets-Sheet 2

INVENTOR.
FREDERICK NEWTON

BY Young, Emery & Thompson
ATTORNEYS

CARBON PILE ELECTRIC REGULATOR

Original Filed Oct. 13, 1939 4 Sheets-Sheet 3

INVENTOR.
FREDERICK NEWTON
BY Young, Emery & Thompson
ATTORNEYS

CARBON PILE ELECTRIC REGULATOR

Original Filed Oct. 13, 1939 4 Sheets-Sheet 4

INVENTOR
FREDERICK NEWTON
BY Young, Emery & Thompson
ATTORNEYS

Reissued Apr. 3, 1951 Re. 23,352

UNITED STATES PATENT OFFICE 23,352

CARBON PILE ELECTRIC REGULATOR

Frederick Newton, Sudbury, England, assignor, by mesne assignments, to The Cleveland Trust Company, trustee, Cleveland, Ohio, a corporation of Ohio Original No. 2,268,718, dated January 6, 1942, Serial No. 299,326, October 13, 1939. Application for reissue January 23, 1951, Serial No. 207,275. In Great Britain April 8, 1938

14 Claims. (Cl. 201—51)

Matter enclosed in heavy brackets [ ] appears in the original patent but forms no part of this reissue specification; matter printed in italics indicates the additions made by reissue

This invention relates to electromagnetic regulators and more especially to voltage and current regulators for dynamo electric generators and electric circuits generally. Its purpose is the production of a regulator of simple construction, of small bulk and weight and consuming but little power, which will give highly sensitive regulation over a wide range about a datum value of the quantity to be controlled.

This regulator consists of a carbon pile rheostat to be inserted in the circuit to be controlled or through which control is exercised, the pile being subjected to the difference between two forces of a magnitude large in relation to the pressure needed to vary the pile resistance over its useful range, these forces being derived from the pull of an electromagnet the excitation of which is dependent on the regulating effect and from an opposing spring.

As is well known, for constant excitation the pull of an electromagnet of usual design upon its armature depends on the length of the air gap between them and, subject to variation of the stray field and other disturbing factors varies inversely as the square of the air gap length. The invention rests on the provision of a counterbalancing force which follows basically the same law of variation as the magnet pull, and on the use of the difference between these two large forces of like characteristic to provide a relatively small differential regulating force.

This counter-balancing force is provided by a spring or beam which rests tangentially against an abutment attached to the electromagnet with which abutment the spring is brought into surface contact over a continuously increasing length by movement of the armature towards the electromagnet. The spring thus begins to wrap upon the abutment as a garment is wrapped about the body, and the length of spring subjected to further bending as the armature moves further toward the electromagnet continuously decreases. The spring thus shortens and becomes stiffer as the length of the air-gap lessens, and by appropriate design of the spring and abutment surface its resistance is readily made to vary inversely as the square of the distance between the point of application of the magnet pull to the spring (hereinafter called the load point) and some fixed datum point which corresponds with zero length of air gap. Thus basic correspondence with the varying magnet pull results. Indeed in the simple instance of a beam of uniform cross-section, straight when unstrained, resting tangentially on mutually inclined straight surfaces the intersection of which corresponds with zero length of air gap, by adjustment of three parameters, namely the magnet pull for a given position of the load point, the inclination of the abutment surfaces to a plane at right angles to the line of movement of the load point, and the relation of the intersection of the abutment surfaces to the "no gap" position of the armature, the "load-deflection" curve of the spring can be made substantially to coincide with the "stroke-pull" characteristic of the electromagnet; or it may be given a greater or less curvature; and the two curves may be made to touch at any desired point, or to cross at any one or two points, or to lie side by side. Thus the difference between the pull of the spring and the pull of the electromagnet may be adjusted to the force required to operate the regulating means at all points in its range, and due allowance may be made for magnetic leakage and other disturbing causes.

For a given path of movement of the load point, determined, for instance, by its attachment to the magnet armature and the guidance of the latter, the wrapping of the spring will in general be accompanied by some relative sliding, and the interposition of an anti-friction device may be desirable. But relative sliding may be eliminated by setting the spring and abutment surface at appropriate opposite inclinations to a plane at right angles to the path of movement of the load point.

The electromagnet will ordinarily be of the iron-clad type, that is with concentric poles; and for the sake of lightness the armature should be of small radial magnetic length. While the spring may be a cantilever mechanically connected in any convenient fashion to the magnet armature and the regulating device, a simpler arrangement is to make it a beam supported at two points and centrally loaded by direct attachment to the armature structure, for instance to an axial armature stem; or it may be of star form presenting a number of rays radiating from the armature stem with arcuate ends resting on an abutment surface of conical form. This symmetrical spring-magnet arrangement may apply pressure either to a single pile co-axial with the magnet or to a number of piles symmetrically disposed around the magnet axis.

The armature may be confined to the movement in the direction of the magnet axis, without opposing frictional resistance to that movement, by means of a diaphragm secured to its stem. The resistance offered by the diaphragm follows a linear law; the pressure-compression relationship of a carbon pile resembles in form the B-H curve of magnetization of iron; in effecting any adjustment of the rheostat the spring-magnet arrangement must overcome these forces. The variation of its pressure needed to adjust the pile over its full range measured as a percentage of the total pressure determines the percentage regulation.

For control of the voltage or current in the circuit of a generator the rheostat is used to govern the field circuit, or a field circuit, of the generator.

In the case of a voltage regulator, if the magnet winding is designed with due regard to economy of copper an error will be introduced by temperature variations which, though it may be reduced by ballast resistance, might remain of importance for some purposes. To eliminate it resort may be had to automatic variation of the governing parameters. A convenient method is to make the spring abutment a bi-metallic structure so that the inclination of the abutment surface varies with temperature, the points of support of the spring moving in the direction of the spring pressure and therefore reducing that pressure as the temperature rises; a much smaller ballast resistance is then adequate. Economy of design is limited also, by the heating of the pile itself, which is liable to deteriorate if too high a temperature is reached; and the invention includes means for cooling the pile as a whole and for keeping its temperature even to obviate local overheating.

The invention is further described below with reference to several constructions of carbon pile regulators embodying it which are illustrated in the accompanying drawings.

In these drawings

Figure 5:
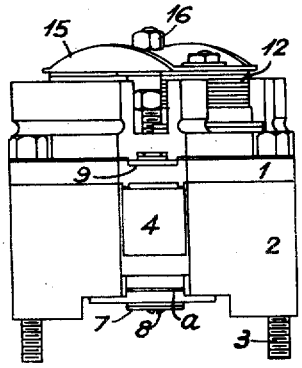
Figure 4:
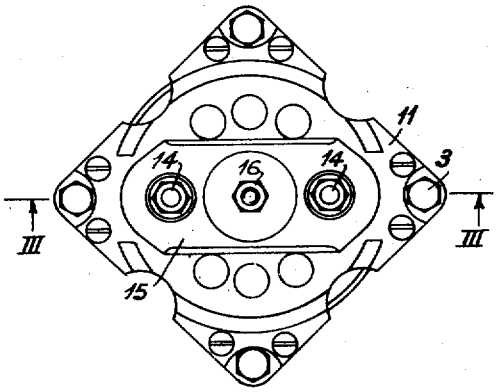
Figure 4 is a plan view of a carbon pile regulator using a beam as shown in Fig. 1.

Figure 5 an elevation, and

Figure 6:
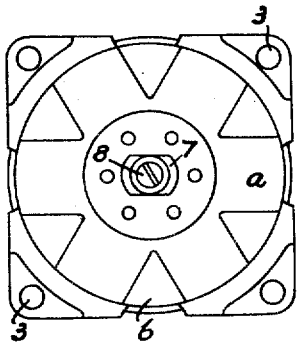
Figure 8:
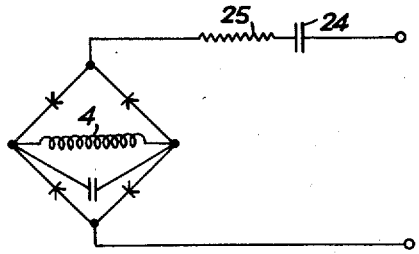
Figure 7:
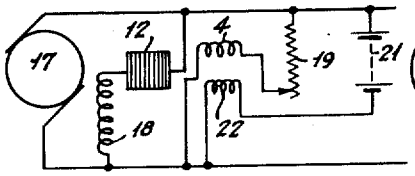
Figure 10:
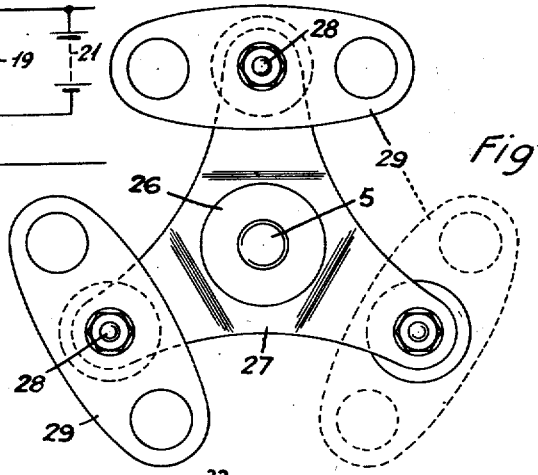
Figure 11:
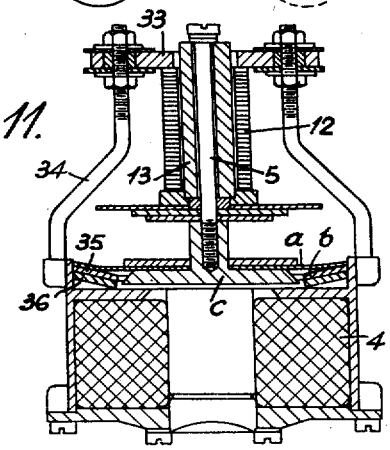
Figure 9:
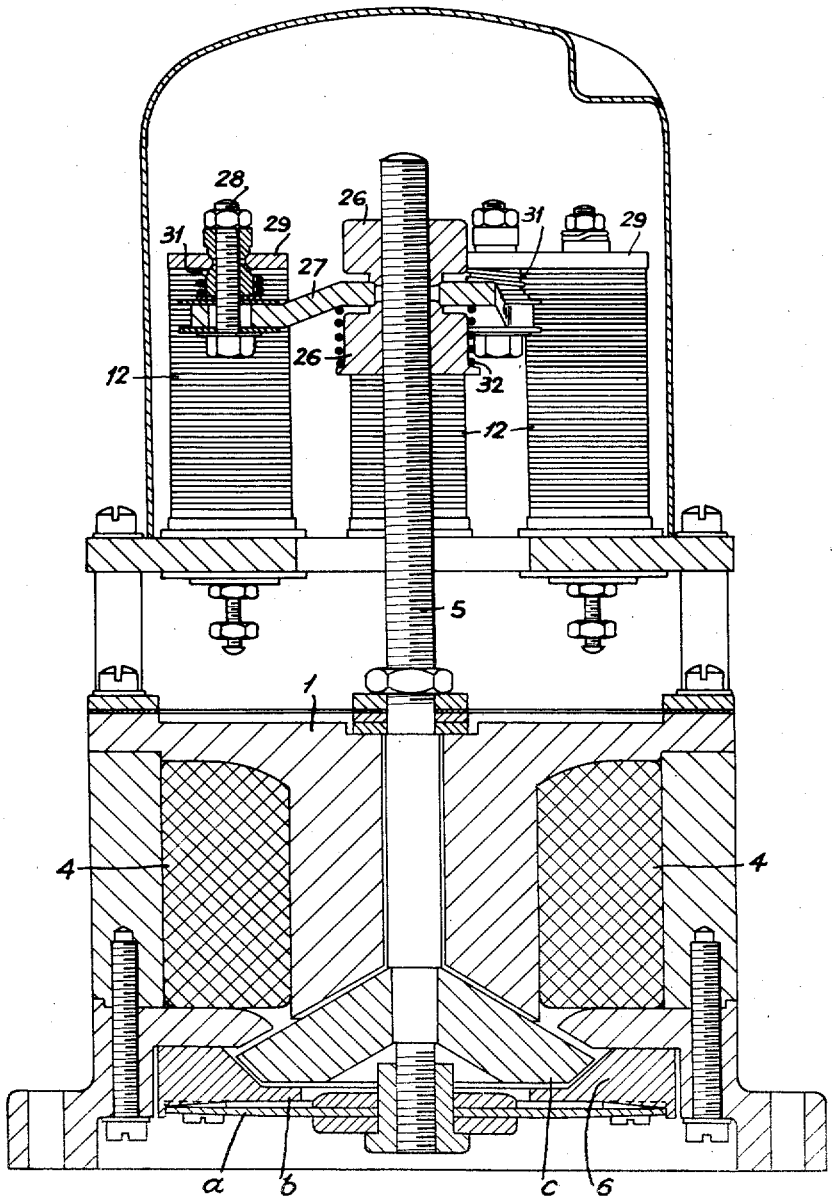
Figure 13:
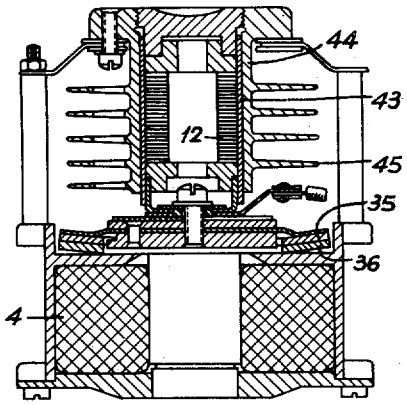
Figure 12:
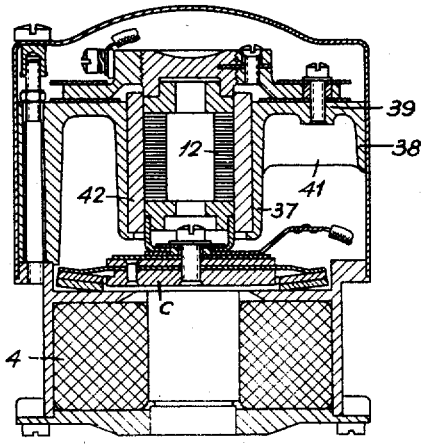

Figure 6 a plan from underneath of one construction of carbon pile regulator;

Figures 7 and 8 are diagrams of connections illustrating typical uses of the regulator;

Figure 9 is in part an axial section and in part an elevation of a multiple pile regulator, and Figure 10 an end elevation of the means employed in it for distributing the pressure evenly over the several piles, and Figures 11 to 13 are axial sections of single pile regulators illustrating means for temperature compensation and means for cooling the pile and keeping its temperature even.

Figure 1:
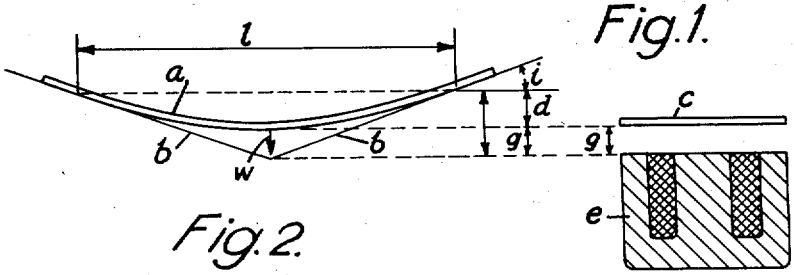
Figures 1 and 2 are diagrams illustrating the principle of the invention.

Figure 1 shows diagrammatically a centrally loaded beam a supported on mutually inclined abutment surfaces b. It may be supposed that the load w on the beam is applied by connecting the midpoint of the beam to the armature c of an electromagnet e shown separately beside the beam.

As is well known the inclination of a beam of uniform section, so loaded, is for small deflections $$i=\frac{wl^2}{16EI}$$

where l is the length between the points of support. As the beam is further loaded the points of support move towards each other, and since the inclination at the points of support is always i, the wrapping of the beam upon its supports is such that $wl^2$ remains constant; i. e. l varies inversely as the square root of w. The altitude of the triangle formed by the chord of the beam and the abutment surfaces b is $$D=\frac{l}{2}\tan i$$

the deflection of the beam at its midpoint is $$d=\frac{wl^3}{48EI}=\left(\frac{wl^2}{48EI}\right)l$$

it follows that the distance g (=D−d) between the midpoint of the beam and the junction of the abutment surfaces varies inversely as $\sqrt{w}$.

The same law connects the air gap length g of the electromagnet with the pull exerted on its armature.

The pull of the spring a at any given initial position such as that illustrated may be made to exceed by the amount required for holding the regulating device, e. g. for maintaining the initial maximum pressure on a carbon pile, the pull of the electromagnet when its armature is in the corresponding position; the inter-section of the abutment surfaces is shown in the figure as corresponding with zero air gap g, but this relation may be altered and as appears from the equations above the increase of spring pull with diminution of the length g, while still following an inverse square law, may be varied by changing the slope i of the abutment surfaces. By suitable choice of these parameters the total movement necessary to adjust the pile over its full range may be made to follow upon any desired variation of the exciting current or exciting voltage. Save for the relatively small force needed to adjust the pile the total magnet pull balances the spring pressure; in other words the total excitation corresponds with the total spring pressure; the tolerable variation in voltage or current determines the variation in excitation and in magnet pull, and corresponds with the variation of pressure needed for full range adjustment of the pile. Thus the percentage regulation desired determines what percentage variation of the total pressure must suffice for full range adjustment of the pile.

Figure 2:
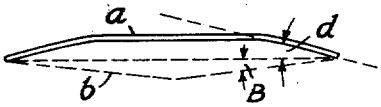
Figure 3:
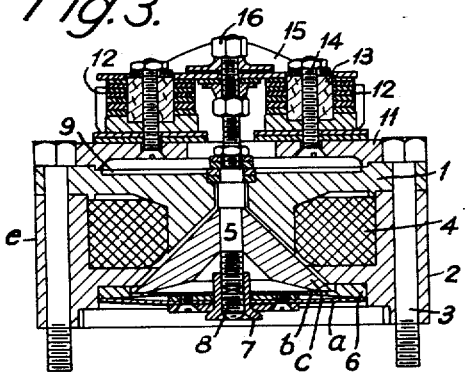
Figure 3 is an axial section on the line III—III of Figure 4.

It will be clear that as the spring of Figure 1 is further bent, its wrapping upon the abutment surfaces will be accompanied by some sliding towards their intersection. Balls or rollers may be inserted to reduce the friction. But the sliding movement may be obviated by oppositely inclining the spring and the abutment surfaces to a plane at right angles to the line of movement of the load point, which is here the middle of the spring. In Figure 2 the dotted line indicates a plane at right angles to the direction of movement of the load point; a is the bent but unstrained spring, its limbs lying at an angle of a to the plane; b, b are the abutment surfaces lying at an angle $\beta$ to the plane on the opposite side of it. To eliminate sliding in such designs as are hereinafter described it is found that the angle a should be about 2, 3 times the angle $\beta$.

In the carbon pile regulator shown in Figures 3 to 6 the iron-clad electromagnet e is built of an end plate and central pole 1, and a body and annular pole 2 secured together by bolts 3 and enclosing a winding 4. The pole faces are shaped to form parts of the same cone, and are bridged by a correspondingly coned armature c of V section fitting tightly upon a spindle 5. The abutment surface b is the coned and polished outer surface of a disc 6 which fits within an extension of the magnet body 2 resting against the annular pole. The spring a is 6-rayed plate spring clamped between two washers which are fastened to the armature by a flared nut 7 screwing upon the threaded end of the spindle 5 and locked by a grub screw 8. The outer edge of the plate spring is ground to circular form and of a size to lie within the extension of the magnet body in which the disc 6 fits. The guidance of the armature is completed by a diaphragm 9, the flexibility of which may be increased by arcuate apertures. This diaphragm is clamped by a nut against a shoulder on the armature spindle 5; it fits within a recess in the outer face of the end plate 1 and is held there by a plate 11 screwed to the end plate 1.

The plate 11 is the base plate of a carbon pile rheostat consisting of two piles of carbon washers 12 threaded on insulating sleeves 13 surrounding screws 14 which pass through the base plate 11 and through a flanged pressure plate 15. The pressure plate is secured to the armature spindle by spherically surfaced nuts 16 bearing on spherically surfaced washers between which the plate is clamped.

It will be clear that the piles are subjected to the difference between the spring pull and the magnet pull, and this is evenly distributed between them.

Use of such a carbon pile regulator as a voltage regulator to maintain constant voltage in a circuit is illustrated by Figure 7. The generator 17 has a shunt field winding 18 in series with the carbon pile 12. The winding 4 of the magnet controlling the rheostat is connected in series with an adjustable ballast resistance 19 across the generator terminals. If the voltage rises the pressure on the pile 12 is diminished and the field is reduced.

Many variations and developments of this circuit are possible. One is shown in Figure 7. If one function of the generator is to charge a battery 21 which may become discharged in a long period of disuse, or to supply any other occasional heavy load, a winding 22 on the magnet controlling the rheostat may be inserted in the battery charging circuit, or heavy load circuit only. This will reduce the voltage until the battery takes only a normal charging current, or the heavy load is taken off, whereupon the constant voltage condition will be re-established.

Alternatively normal service loads may be supplied from one circuit connected across the generator 17, and intermittent abnormal loads may be connected directly across the battery 21 so that the resultant voltage drop on the battery terminals brings into action without any change of connections the control winding 22 and both generator and battery share the increased load.

If constant current instead of constant voltage is desired, the magnet winding 4, suitably designed for the purpose, will be placed in series with the generator. One and the same machine may have both voltage and current regulators, the two carbon piles being placed in series in the field circuit; or a double regulator may be made by placing a single pile between two spring and magnet units the magnets being held a fixed distance apart by bolts and distance pieces, and the two springs compressing the pile between them. In the case of a regulator for an alternator the magnet winding 4 will of course be supplied through a suitable rectifying circuit, for instance as indicated in Figure 8. In the case of low frequencies to which the armature might respond by vibration, the excitation is smoothed either by a shunt condenser in the exciting circuit or by a short-circuited ring on the magnet core. A possibility of defective regulation may arise in the case of an alternator if the alternator wave form varies under varying conditions of load; for unless the ratio of the root means square to mean value of voltage or current, as the case may be, remains constant the regulation will be affected. To eliminate this sort of disturbance the magnet may be supplied through a compensating circuit built for instance of a condenser 24 shunted by or in series with ohmic resistance 25.

The spring and electromagnet armature may operate a pressure plate placed in the middle of a carbon pile, or of two carbon piles. For example the ends of two piles so controlled may be cross-connected and the cross connectors joined to a D. C. source of excitation, while the midpoints of the piles where pressure is applied are connected to a booster field winding on the generator to be controlled, so giving automatic reversing regulation; the piles may, without instability, be brought to a condition of very high resistance before reversal of the current in the booster winding occurs.

Damping of the regulator has not been found necessary in most circumstances the motion of the moving parts being aperiodic, but can readily be provided by a dash pot. For example the diaphragm by which the armature spindle is guided (made imperforate for this purpose), may form one of two elastic end walls of a chamber divided by a rigid partition in which is a small and preferably adjustable aperture. The chamber may be partly or wholly filled with liquid, so that all movement of the diaphragm or movement beyond a given limit is damped by the passage of liquid through the partition.

Hunting may, however, occur when the regulator controls the field not of the principal generator but of its excitor, due to the exciter field building up or falling more quickly than the generator field. To overcome this the regulator while being operated by a principal exciting winding in shunt across the generator, may have an additional exciting coil in shunt across the excitor normally balancing another exciting coil in series with the main field circuit. Such balancing shunt and series coils may be connected across and in series with any field to be regulated to stabilize the operation.

Alternatively the response of the excitor field may be delayed, or in other words its effective time constant greatly increased, by connecting across either the carbon pile, or the excitor field winding in series with it—and in series if desired with another, fixed, resistance—an electrical motor, which may be a permanent magnet machine or have a shunt, series, or compound field, and may, if desired, have a flywheel on its shaft. Such a machine acts like a very large resistive condenser in shunt to the winding. Its action may be confined to increase or decrease of field strength by placing in its circuit.

A regulator of the form shown in Figues 3 to 6 or in the forms described below may readily be made of high sensitivity. Alternatively two regulators of less sensitivity may be employed in cascade, a small regulator controlled by the machine to be regulated governing the current in a larger regulator which regulates the machine.

Larger regulators may conveniently be made with a greater number of piles. Figures 9 and 10 show a regulator with six piles. The construction of the electromagnet, armature and spring though differing in detail from that shown in Figures 3 to 6 will be sufficiently understood from the marking of corresponding parts with the same reference letters. But additional care is needed to distribute the pressure of the spring and electromagnet evenly on all the piles, notwithstanding manufacturing tolerance. There is attached to the armature spindle 5 by means of chamfered nuts 26, a three-armed spider 27. Each arm carries at its end a bolt 28 to which is similarly secured between chamfered nuts a pressure plate 29 by which pressure is applied to two piles. The centre of mass of each pressure plate is close to its point of support, and the centre of mass of spider and pressure plates together is close to the point of support of the former. The chamfered nuts must be loose enough to admit of the requisite swivelling motion, and in order that this play may not increase the requisite deflection of the spring a spring 31 may be inserted between the spider and each pressure plate, and a spring 32 between the spider and a flange on one of its supporting nuts. With this arrangement change in the position of the regulator does not vary the distribution of pressure.

On the other hand for small regulators a single pile will suffice, and a suitable construction of this is shown in Figure 11. The pile is made coaxial with the magnet, the carbon washers being assembled upon a porcelain sleeve encasing the armature spindle 5. At the outer end the pressure of the pile is taken by a stout carbon washer 33 carried by but insulated from crooked stanchions 34 fixed in a flange on the magnet body. The stanchions support the pile at a sufficient distance from the electromagnet for the winding of the latter not to be unduly affected by the relatively high temperature of the pile. Compensation for temperature changes is obtained by making the abutment surface b the surface of a bi-metallic coned disc 36, 36 made, for instance, of the nickel iron alloy sold under the trade name of "Invar" and of brass. The edge of the disc resting on the magnet pile provides a fixed datum line, while any point on which the spring may abut at a greater radius will move up or down as the temperature falls or rises. This compensation is only needed for a voltage regulator; the provision of it makes a smaller ballast resistance suffice.

The carbon pile is constantly carrying current, and one limiting factor in its design is its ability to dissipate the heat generated in it without at any point reaching such a temperature as may disintegrate the carbon discs or washers of which it is built up. Where a protecting casing is employed as in Figure 11 the still body of air between it and the pile is in effect a heat insulation, and hinders dissipation of the heat generated. To overcome this the space between pile and casing may be bridged, as shown in Figure 12 by a metal body preferably of aluminum having one part 37 closely encasing the pile, another part 38 making good thermal contact with the casing, and between them a sufficient bridge piece consisting of a disc 39 and webs 41 radially to conduct heat from the inner part to the outer. This metal block must not short circuit the pile, and therefore must be enamelled or otherwise electrically insulated on its inner surface; but between it and the pile there must be a minimum of substance capable of sustaining a steep temperature gradient. In Figure 12 the pile is shown as contained in a sleeve 42 of heat conducting porcelain such as is used in the manufacture of spark plugs.

Not only does this heat dissipator keep down the temperature of the pile as a whole but also it equalizes the pile temperature, eliminating hot spots. For this latter purpose it may be desirable to retain the rod 5 and sleeve 13 on which the carbon washers are threaded in Figure 11, though they are no longer needed for the mechanical structure of the pile and are omitted in Figure 12.

Where a protecting casing can be dispensed with the heat dissipator may have integral or attached fins for the better dissipation of heat. In Figure 13 the pile is surrounded by a quartz tube 43 on which fits a sleeve of metal 44 with fins 45. These may be integral as shown, or they may consist of discs divided into sectors, with turned-over inner edges upon which a spring retaining ring or a helical spring can engage.

It will be clear that the regulator may be employed for controlling the voltage or current in an electric circuit irrespective of the source from which it is supplied by varying the resistance in series with or in shunt across the circuit. It may also be employed for regulating any prime mover, by having the prime mover drive an electric generator from which the magnet of the spring-magnet combination is supplied. A regulator so employed may act upon the throttle of the engine or on any other control device.

I claim:

1. An electric regulator comprising a carbon pile, an abutment attached to one end of said pile built of two metals of different coefficients of expansion so that the inclination of its free surface varies with temperature, a spring exerting pressure between said abutment surface and the other end of said pile to compress the pile and wrapping upon said abutment as the spring is stressed to reduce the free length of the spring, and an electromagnet and armature opposing the action of said spring upon the pile.

2. An electric regulator comprising a carbon pile, an electromagnet mechanically attached to one end of said pile [an] *a substantially annular* abutment upon said electromagnet *and having a recess defined by a surface of the abutment which converges from the periphery of the recess toward the bottom and center thereof,* a *single leaf* spring *substantially symmetrical about the axis of said electromagnet and* resting tangentially against the *converging* surface of said abutment, an armature for said electromagnet, and means connecting said armature and spring together and to the other end of said pile, so that movement of the armature towards the magnet wraps the spring upon said abutment, and the pile is subjected to the difference between the magnet pull and the spring pressure, *said single spring constituting the sole yieldable pressure supplying means acting to apply pressure to said pile in the direction to compress the same.*

3. In a control apparatus, an abutment device having [mutually inclined surfaces] *a substantially frusto-conical recess defined by a surface of the abutment device which converges axially and radially from the periphery of the recess toward the center thereof,* a resilient beam *comprising a plate spring of a generally circular shape* bridging said [surfaces] *recess and having marginal portions adapted to bear on said*

*surface*, an electromagnet having pole pieces, an armature, said pole pieces and armature constituting two relatively movable members, one of said members being connected to said abutment and the other member being connected to the midpoint of the resilient beam, said members operating upon energization of the electromagnet to force the midpoint of the beam further into the angle *of the abutment recess*, causing [the end] *said marginal* portions of the beam progressively to contact the [mutually inclined surfaces] *converging abutment surface*, progressively reducing the effective [length] *span* of the beam and progressively increasing the resistance to displacement by the electromagnet, and a carbon pile electric resistance having a movable member for varying the compression of the pile actuated by the relative displacement of said electromagnet pole pieces and armature.

4. In a control device, an abutment having an opening therein, a frusto-conical seat within the opening having a surface converging axially and radially from the periphery of the opening toward the center thereof, a plate spring having edge portions engaging said converging surface to bridge the portions of the converging surface engaged by the spring, an electromagnet having pole pieces, an armature, said pole pieces and armature constituting two relatively movable members, one of said members being connected to said abutment and the other member being connected to the midpoint of the resilient spring and operable upon energization of the electromagnet to force the midpoint of the spring toward the point of convergence of said converging surface causing portions of the surface of the spring adjacent the converging surface to progressively contact the converging surface from the peripheral portions of the spring toward the midpoint thereof, progressively reducing the effective length between portions of the converging surface bridged by the spring and the midpoint of the latter, and a carbon pile electric resistance having a movable member for varying the compression on said pile, actuated by the relative displacement of the members of said electromagnet, said frusto-conical seat comprising joined bi-metal layers responsive to temperature variations for varying the convergency of the seat.

5. In a control device, an abutment having a recess, the surface of said recess converging from the periphery thereof toward the bottom and center thereof, a plate spring having end portions engaging said converging surface to bridge the portions of the converging surface engaged by the spring, an electromagnet having pole pieces, an armature, said pole pieces and armature constituting two relatively movable members, one of said members being connected to said abutment and the other member being connected to the midpoint of the resilient spring and operable upon energization of the electromagnet to force the midpoint of the spring toward the point of convergence of said converging surface causing portions of the surface of the spring adjacent the converging surface to progressively contact the converging surface from the end portions of the spring toward the midpoint thereof, progressively reducing the effective length between portions of the converging surface bridged by the spring and the midpoint of the latter, the portions of said plate spring adjacent the ends thereof extending at an angle to the plane of the plate spring in directions opposite those which said portions assume when forced into engagement with the converging surface to eliminate slippage of the end portions of said plate spring relative to the converging surface, and a carbon pile electric resistance having a movable member for varying the compression on said pile, actuated by the relative displacement of the members of said electromagnet.

6. In a control apparatus, an abutment device having mutually inclined surfaces, a resilient beam bridging said surfaces, an electromagnet having pole pieces, an armature, said pole pieces and armature constituting two relatively movable members, one of said members being connected to said abutment and the other member being connected to the midpoint of the resilient beam, said members operating upon energization of the electromagnet to force the midpoint of the beam further into the angle between the surfaces of the abutment, causing the end portions of the beam progressively to contact the mutually inclined surfaces, progressively reducing the effective length of the beam bridged between them and progressively increasing the resistance to displacement by the electromagnet, and a carbon pile electric resistance having a movable member for varying the compression of the pile actuated by the relative displacement of said electromagnet pole pieces and armature, the portions of said beam adjacent the ends thereof being mutually inclined toward said abutment surfaces to increase the angle between said portions of the spring and said abutment surfaces to substantially eliminate slippage between the portions of said spring in engagement with the abutment surfaces and said surfaces.

7. In a control apparatus, an abutment device having mutually inclined surfaces, a resilient beam bridging said surfaces, an electromagnet having pole pieces, an armature, said pole pieces and armature constituting two relatively movable members, one of said members being connected to said abutment and the other member being connected to the midpoint of the resilient beam, said members operating upon energization of the electromagnet to force the midpoint of the beam further into the angle between the surfaces of the abutment, causing the end portions of the beam progressively to contact the mutually inclined surfaces, progressively reducing the effective length of the beam bridged between them and progressively increasing the resistance to displacement by the electromagnet, and a carbon pile electric resistance having a movable member for varying the compression of the pile actuated by the relative displacement of said electromagnet pole pieces and armature, and means responsive to temperature variations for varying the inclination of said mutually inclined surfaces.

8. An electric voltage or current regulator comprising an iron-clad electromagnet, a carbon pile having its elements symmetrically disposed about the axis of said electromagnet and compressed between a pressure plate and the electromagnet, [an] *a substantially annular* abutment upon said electromagnet *and having a recess defined by a surface of the abutment which converges from the periphery of the recess toward the bottom and center thereof*, a *single* leaf spring of star form *spanning said recess and* having the ends of its rays resting against *the converging surface of* said abutment and wrapping upon it as the spring is further stressed to reduce the effective lengths of the rays of the star spring and thereby increase the resistance of the spring to further deflection, an armature for said electromagnet, and means attaching said armature and the middle of said spring to the pressure plate, so that the pile is subject to the difference between spring pressure and the magnet pull, *said single spring constituting the sole yieldable pressure supplying means acting to apply pressure to said pile in the direction to compress the same.*

9. An electric voltage or current regulator comprising an iron-clad electromagnet, a carbon pile composed of a plurality of component pile elements symmetrically disposed about the axis of said electromagnet and attached at one end to the electromagnet, a pressure plate bearing upon the ends of not more than three component pile elements, an abutment upon said electromagnet, a *single* leaf spring symmetrical about the electromagnet axis having its ends resting on said abutment, and wrapping upon the abutment as the spring is further stressed to reduce the effective length of the spring and thereby increase the resistance of the spring to further deflection, an armature for said electromagnet, and means connecting said armature and the middle of said spring to said pressure plate to apply pressure thereto while permitting rocking thereof, *said single spring constituting the sole yieldable pressure supplying means acting to apply pressure to said pile in the direction to compress the same.*

10. An electric voltage or current regulator comprising an iron-clad electromagnet, a carbon pile composed of a plurality of component pile elements symmetrically disposed about the axis of said electromagnet and attached at one end to the electromagnet, a pressure plate bearing upon the ends of not more than three component pile elements, a spider bearing upon not more than three pressure plates and permitting them to rock, an abutment upon said electromagnet, a *single* leaf spring symmetrical about the electromagnet axis having its ends resting on said abutment, and wrapping upon the abutment as the spring is further stressed to reduce the effective length of the spring and thereby increase the resistance of the spring to further deflection, an armature for said electromagnet, and means connecting said armature and the middle of said spring to said spider to apply pressure thereto while permitting rocking thereof, *said single spring constituting the sole yieldable pressure supplying means acting to apply pressure to said pile in the direction to compress the same.*

11. An electric regulator comprising a carbon pile, an electromagnet mechanically attached to one end of said pile, an abutment upon said electromagnet, a spring resting tangentially against the surface of said abutment, an armature for said electromagnet, means connecting said armature and spring together and to the other end of said pile so that movement of the armature towards the magnet wraps the spring upon said abutment, and the pile is subjected to the difference between the magnet pull and the spring pressure, and means responsive to temperature variations for varying the inclination of the surface of the abutment upon which the spring wraps.

12. In a control apparatus, [an] *a substantially annular* abutment device having [mutually inclined surfaces] *a recess defined by a surface of the abutment which converges from the periphery of the recess toward the bottom and center thereof,* a resilient beam bridging said [surfaces] *recess,* an electromagnet having pole pieces, *said beam comprising a plate spring substantially symmetrical about the axis of said electromagnet and having outer marginal portions adapted to bear on said surface,* an armature, said pole pieces and armature constituting two relatively movable members, one of said members being connected to said abutment and the other member being connected to the midpoint of the resilient beam, said members operating upon energization of the electromagnet to force the midpoint of the beam further into the angle [between the surfaces of the abutment] *of said recess,* causing *said marginal* portions of the beam progressively to contact [the mutually inclined surfaces] *said surface,* progressively reducing the effective length of the beam and progressively increasing the resistance to displacement by the electromagnet, and variable electric resistance means having a movable part actuated by the relative displacement of the members of said electromagnet, *said marginal portions being mutually inclined toward said surface to thus increase the angle between said marginal portions and said surface for substantially eliminating slippage therebetween.*

13. *An electric regulator comprising a carbon pile, an electromagnet mechanically attached to one end of said pile, an abutment upon said electromagnet and having a recess defined by surface portions of the abutment converging toward said pile, a single spring comprising a plate member resting tangentially against the converging surface portions of said abutment, an armature for said electromagnet, means connecting said armature and spring together and to the other end of said pile, so that movement of the armature towards the magnet wraps the spring upon said surface portions of the abutment, and the pile is subjected to the difference between the magnet pull and the spring pressure, and means extending axially of the regulator and forming shoulder means on opposite sides of said recess, said spring constituting the sole yieldable pressure supplying means acting to apply pressure to said pile in the direction to compress the same and being of a transverse dimension to extend between and engage said shoulder means such that slippage between the spring and abutment is substantially prevented.*

14. *An electric regulator comprising a carbon pile, an electromagnet mechanically attached to one end of said pile, a substantially annular abutment upon said electromagnet and having a recess defined by a surface of the abutment which converges from the periphery of the recess toward the bottom and center thereof, a single spring comprising a plate member substantially symmetrical about the axis of said electromagnet, said spring spanning said recess and resting tangentially against the converging surface of said abutment, an armature for said electromagnet, means connecting said armature and spring together and to the other end of said pile, so that movement of the armature towards the magnet wraps the spring upon said abutment, and the pile is subjected to the difference between the magnet pull and the spring pressure, and means extending axially of the regulator and forming shoulder means around the periphery of said recess, said spring constituting the sole yieldable pressure supplying means acting to apply pressure to said pile in the direction to compress the same and being of a transverse dimension to ex-*

*tend between and engage said shoulder means such that slippage between the spring and abutment is substantially prevented.*

FREDERICK NEWTON.

REFERENCES CITED

The following references are of record in the file of this patent or the original patent:

UNITED STATES PATENTS

| Number | Name | Date |
|---|---|---|
| 1,058,731 | Creveling | Apr. 15, 1913 |
| 1,119,800 | Bradley | Dec. 8, 1914 |
| 1,144,299 | Creveling | June 22, 1915 |
| 1,177,685 | Cheveling | Apr. 4, 1916 |
| 1,213,809 | Ray | Jan. 23, 1917 |
| 1,252,511 | Turbayne | Jan. 8, 1918 |
| 1,366,945 | Rojas | Feb. 1, 1921 |
| 1,700,041 | Grot | Jan. 22, 1929 |
| 1,917,472 | Ohlsen | July 11, 1933 |
| 1,939,870 | Wike | Dec. 19, 1933 |
| 1,971,747 | Fletcher | Aug. 28, 1934 |
| 2,127,521 | Kemp | Aug. 23, 1938 |
| 2,140,530 | Kemp | Dec. 20, 1938 |
| 2,172,678 | Hefter | Sept. 12, 1939 |

FOREIGN PATENTS

| Number | Country | Date |
|---|---|---|
| 399,837 | Great Britain | 1933 |
| 414,112 | Great Britain | July 30, 1934 |
| 513,189 | France | Oct. 28, 1920 |
| 565,770 | France | Feb. 4, 1924 |
| 70,833 | Switzerland | June 23, 1915 |